United States Patent [19]

Ide

[11] Patent Number: 5,033,871
[45] Date of Patent: Jul. 23, 1991

[54] EXTRUDABLE MULTI-RIGIDITY HYDRODYNAMIC BEARING AND METHOD OF MAKING THE SAME

[76] Inventor: Russell D. Ide, P.O. Box 744, 641 Arnold Rd., Coventry, R.I. 02816

[21] Appl. No.: 544,933

[22] Filed: Jun. 28, 1990

Related U.S. Application Data

[63] Continuation-in-part of Ser. No. 262,352, Oct. 25, 1988, abandoned.

[51] Int. Cl.[5] .............................................. F16C 17/03
[52] U.S. Cl. .................................... 384/98; 384/125; 384/220; 384/312; 384/117
[58] Field of Search ................... 384/97, 98, 312, 125, 384/220, 221, 222, 297, 117

[56] References Cited

U.S. PATENT DOCUMENTS

| | | |
|---|---|---|
| 1,991,461 | 2/1935 | Howarth . |
| 2,424,028 | 7/1947 | Haeberlein . |
| 2,778,696 | 1/1957 | Lease . |
| 2,890,916 | 6/1959 | Maynard . |
| 2,906,571 | 9/1959 | Casacci . |
| 3,062,598 | 11/1962 | Summers . |
| 3,107,955 | 10/1963 | Trumpler . |
| 3,424,505 | 1/1969 | Pizzitola . |
| 3,675,977 | 7/1972 | Arsenius et al. . |
| 3,687,506 | 8/1972 | Dee . |
| 3,791,703 | 2/1974 | Ifield . |
| 3,829,180 | 8/1974 | Gardner . |
| 3,881,791 | 5/1975 | Hentschel . |
| 3,899,224 | 8/1975 | Schuller et al. . |
| 3,902,770 | 9/1975 | Hepp et al. . |
| 3,902,771 | 9/1975 | Daugherty . |
| 3,913,989 | 10/1975 | Williams . |
| 3,930,691 | 1/1976 | Greene . |
| 3,944,304 | 2/1976 | Purtschert . |
| 3,951,475 | 4/1976 | Okano et al. . |
| 3,954,309 | 4/1976 | Hutson et al. . |
| 3,971,606 | 7/1976 | Nakano et al. . |
| 4,118,079 | 10/1978 | Newman et al. . |
| 4,133,585 | 1/1979 | Licht . |
| 4,178,046 | 12/1979 | Silver et al. . |
| 4,227,752 | 10/1980 | Wilcock . |
| 4,243,274 | 1/1981 | Greene . |
| 4,268,094 | 5/1981 | Greene . |
| 4,277,113 | 7/1981 | Heshmat . |
| 4,290,656 | 9/1981 | Daugherty . |
| 4,319,790 | 3/1982 | Thomson . |
| 4,325,585 | 4/1982 | Sugita . |
| 4,382,199 | 5/1983 | Isaacson ........................ 310/87 |
| 4,403,873 | 9/1983 | Gardner ........................ 384/306 |
| 4,435,839 | 3/1984 | Gu et al. ........................ 384/103 |
| 4,459,047 | 7/1984 | Silver ........................ 384/105 |

(List continued on next page.)

FOREIGN PATENT DOCUMENTS

| | | |
|---|---|---|
| 0206686 | 12/1986 | European Pat. Off. . |
| 879116 | 10/1961 | Fed. Rep. of Germany . |
| 1010959 | 6/1952 | France . |
| 1370522 | 10/1974 | United Kingdom . |
| 1458047 | 12/1976 | United Kingdom . |

OTHER PUBLICATIONS

B. F. Goodrich, *Cutless Bearings for Propeller Shafts and Rudders*, Bulletin No. 482-F, pp. 1-6 (1957).
Carlisle Geauga Co., *Your Single Source for Custom Rubber & Plastic Products Brochure*, pp. 1-15 (no date).

*Primary Examiner*—Lenard A. Footland
*Attorney, Agent, or Firm*—Marks Murase & White

[57] ABSTRACT

A hydrodynamic bearing constructed entirely of non-newtonian fluidic materials such as rubber, plastic and the like. The bearing is extrudable and includes a bearing pad support structure and a plurality of bearing pads formed with bearing pad support structure. The bearing pads may be formed of a material which is softer than the support structure. The bearing may also include a number of deflection control members fused to the bearing pads and/or the bearing pad support structure. The method of making the bearing inlcudes the steps of extruding one or more materials to form an uncured tubular extrusion, curing the tubular extrusion, cutting the tubular extrusion into bearing segments and sizing the bearing segments by machining the individual segments to the desired inner and outer diameters.

35 Claims, 9 Drawing Sheets

U.S. PATENT DOCUMENTS

| | | | |
|---|---|---|---|
| 4,496,251 | 1/1985 | Ide | 384/117 |
| 4,515,486 | 5/1985 | Ide | 384/117 |
| 4,526,482 | 7/1985 | Ide | 384/104 |
| 4,531,846 | 7/1985 | Raj | 384/478 |
| 4,560,014 | 12/1985 | Geczy | 175/107 |
| 4,583,870 | 4/1986 | Schnittger | 384/114 |
| 4,639,146 | 1/1987 | Yoshioka et al. | 384/99 |
| 4,647,227 | 3/1987 | Clebant | 384/99 |
| 4,654,939 | 4/1987 | Silver | 29/149.5 |
| 4,676,668 | 6/1987 | Ide | 384/117 |
| 4,725,151 | 2/1988 | Orndorff, Jr. | 384/98 |
| 4,738,453 | 4/1988 | Ide | 277/81 R |

EXTRUDABLE MULTI-RIGIDITY HYDRODYNAMIC BEARING AND METHOD OF MAKING THE SAME

BACKGROUND OF THE INVENTION

This application is a continuation-in-part of and claims the benefits of 35 USC §120 with respect to U.S. application Ser. No. 07/262,352 filed Oct. 25, 1988, now abandoned.

The present invention relates to hydrodynamic bearings. In such bearings, a rotating object such as a shaft is supported by a stationary bearing via a pressurized fluid such as oil, air or water. Hydrodynamic bearings are often, but not exclusively, employed in so-called process lubricated applications in which the bearing is lubricated by the available fluid rather than a typical lubricant such as oil. Specific applications include pump line shaft bearings which may be lubricated by the fluid being pumped or marine shaft bearings which are lubricated by water.

Hydrodynamic bearings take advantage of the fact that when the rotating object moves, it does not slide along the top of the fluid. Instead, the fluid in contact with the rotating object adheres tightly to the rotating object, and motion is accompanied by slip or shear between the fluid particles through the entire height of the fluid film. Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is deflected at a small angle to the rotating member, the fluid will be drawn into the wedge-shaped opening, and sufficient pressure will be generated in the fluid film to support the load. This fact is utilized in thrust bearings for hydraulic turbines and propeller shafts of ships, as well as in the conventional journal bearing with fluid lubrication. Although oil is typically the fluid of choice for heavy loads, lighter loads can be supported with other fluids such as air or water.

The bearings of the present invention can be used as a substitute for the so-called cutless style or wear-type rubber bearings commonly employed in marine and other applications. Although, these cutless or wear-type bearings include a water wedge to achieve a hydrodynamic effect, they suffer from a number of structural limitations and inevitably experience wear. As discussed below, the inventor has discovered that the limitations of these bearings are primarily attributable to their structure which consists of a relatively large cross section of soft single durometer rubber mounted in a cylindrical metal tube. There is little variation in rigidity across the surface of the bearing. Because of the softness of the rubber and the relatively large axial cross section of the soft rubber, this bearing has insufficient radial stiffness to achieve optimum performance.

The present invention also relates to a hydrodynamic bearing having beam-mounted bearing pads. A good example of a beam-mounted bearing pad is disclosed in U.S. Pat. No. 3,107,955 to Trumpler. In such bearings, the hydrodynamic bearing pad is mounted on beam-like support members so that the pad can deflect to form a hydrodynamic wedge.

Although hydrodynamic bearings and beam-mounted bearing pads have been known for some time, it is only recently, with the assistance of computer aided finite element analysis, that the present inventor has discovered the tremendous significance of the relatively small deflections which occur when hydrodynamic bearings are loaded. Aside from a limited number of exceptions such as U.S. Pat. No. 3,107,955 to Trumpler, these deflections, which are difficult to physically measure, had previously been regarded as insignificant and/or ignored by bearing designers. However, the present inventor has discovered that by modeling the performance of hydrodynamic bearings on computers the deflections can be predetermined and bearings having dramatically improved performance characteristics can be designed. These bearings can be generally characterized as including at least one beam-mounted bearing pad. Examples of such improved bearings are described in the inventor's previous U.S. Pat. Nos. 4,496,251; 4,526,482 and 4,676,668.

U.S. Pat. No. 4,496,251 discloses, among other things, a bearing which includes a pad which deflects with weblike ligaments so that the wedge shaped film of lubricant is formed between the relatively moving parts.

U.S. Pat. No. 4,515,486 discloses, among other things, hydrodynamic journal and thrust bearings which comprise a number of bearing pads, each pad having a face member and a support member that are separated and bonded together by an elastomeric material.

U.S. Pat. No. 4,676,668 discloses, among other things, a bearing in which the bearing pads may be spaced from the support member by at least one leg which provides flexibility in three directions. To provide flexibility in the plane of motion, the legs are angled inward to form a conical shape with a point of intersection in front of the pad surface. Each leg has a section modulus that is relatively small in the direction of desired motion to permit compensation for misalignment.

Finally, U.S. Pat. No. 4,526,482 discloses, among other things, a hydrodynamic bearing which is primarily intended for process lubricated applications, i.e., the bearing is designed to work in a fluid. The hydrodynamic bearing is formed with a central section of the load carrying surface that is more compliant than the remainder of the bearing so that it will deflect under load and for a pressure pocket of fluid to carry high loads.

The bearings described in the aforementioned patents are typically at least partially metallic and have shapes which cannot be easily extruded but have been found to be most suitable for certain applications. Nevertheless, these bearings can typically be produced at a cost far below those of bearings with similar performance capabilities. This is because the bearings of the present invention are typically both less complex than competitive bearings and smaller than competitive bearings. Moreover, these bearings exhibit remarkably improved wear characteristics. This improved performance is primarily attributable to the designer's appreciation of the forces the bearings will be subject to and the resulting bearing design which accommodates the forces.

Despite the many advantages and economies associated with these bearings, it is desirable to find a way to reduce further the cost of producing such bearings. This is particularly true in those contexts in which the high performance of the bearings described in the applicant's previous patents is not required.

The present invention also relates to the use of non-newtonian fluids such as plastic, rubber and the like in hydrodynamic bearings. Non-newtonian fluids are characterized as real fluids. All real fluids have internal friction so that their rate of deformation is proportional to the applied shear stress. If the rate of deformation is directly proportional, it is called a newtonian fluid if not, the fluid is called a non-newtonian fluid. Thus, non-newtonian fluids may be generally characterized as fluids whose viscosity changes with rate of flow. The use of non-newtonian fluidic materials offers unique advantages and presents significant obstacles by virtue of the unique characteristics of the non-newtonian fluids.

For instance, when a non-newtonian fluid such as plastic or rubber is restrained, it becomes incompressible. However, when the same material is unrestrained it flows in a predictable manner in response to an applied load. Furthermore, non-newtonian fluidic materials such as rubber, plastic or the like are typically less expensive than the metallic materials generally employed in bearing constructions. Manufacture of non-newtonian fluidic material parts is typically easier than manufacture of comparable metallic parts.

Despite the many advantages expected to accrue from the use of non-newtonian fluidic materials in hydrodynamic bearings, such materials have only been used to a limited extent.

SUMMARY OF THE INVENTION

The present invention is a hydrodynamic bearing suitable for use in process lubricated as well as other applications and a method of making the bearing. The bearing has a constant cross-section so that it can be easily extruded, i.e., it has an extrudable shape. The bearing includes a plurality of beam-mounted bearing pads. Additionally, the bearing can be extruded as a composite of two or more non-newtonian, preferably elastomeric or polymeric, materials such as plastic, rubber or the like having varied stiffnesses, in other words, a multidurometer composite plastic so as to achieve the benefits of varied stiffness or rigidity across the pad surface. Alternatively, or in addition, varying rigidity can be achieved by undercutting the bearing pads.

More specifically, in the case of a composite bearing, the bearing of the present invention is an extrudable multidurometer hydrodynamic bearing. The bearing is constructed entirely of non-newtonian fluidic materials and has an extrudable axial cross-section. The bearing includes a generally circumferential skeletal bearing pad support portion having a predetermined hardness. The skeletal portion has inner and outer circumferential surfaces. A plurality of inner axial grooves are formed in the inner surface and a plurality of outer axial grooves are formed in the outer surface. The inner axial grooves and the outer axial grooves are spaced with respect to one another to define a plurality of beam-mounted bearing pad support surfaces. The bearing also includes a plurality of bearing pads having a predetermined hardness which is less than the predetermined hardness of the skeletal portion. Each of the bearing pads is fused to a corresponding bearing pad support surface. The bearing may also include deflection control members fused into the inner grooves and/or the outer grooves. The deflection control members are preferably softer than the skeletal bearing pad support portion.

In the case of a single duometer bearing the inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members of the hydrodynamic bearing. The shape of the support members has been found to be particularly important.

The present invention also relates to a hydrodynamic bearing having a plurality of bearing pads formed of a relatively soft non-newtonian fluidic material. The bearing pads have arc shaped or concave faces and are constrained so as to deflect under the load normally applied by a supported shaft, in a manner which provides a wedge shaped gap between the shaft and the arc shaped face of the bearing pad.

By virtue of the varying stiffness, the bearing exhibits improved performance characteristics. In particular, the use of stiff as well as soft flexible non-newtonian fluidic materials allows the bearing to retain sufficient stiffness to ensure proper formation of a hydrodynamic wedge. Thus, the present invention obviates the problems experienced with known cutless or wear-type bearings.

Moreover, by virtue of its construction of relatively inexpensive non-newtonian fluidic materials, preferably elastomeric or polymeric materials such as plastic, rubber or the like and its ability to be extruded, the bearing can be produced at significantly lower costs than other non-extrudable bearings. In fact, preliminary indications suggest that the bearing can be produced in quantity for less than 1% of the cost of competitive marine style bearings.

The present invention also takes advantage of the physical characteristics associated with non-newtonian fluids. For example, as noted, above certain non-newtonian fluids such as polymers and elastomers become incompressible when restrained. The present invention provides a hydrodynamic bearing constructed entirely of non-newtonian fluids having a plurality of sections, the sections having significantly different durometers (hardness or stiffnesses) or rigidities. The sections are formed such that a first, harder, section restrains a second softer section so that the second section is stiff, i.e., substantially incompressible in the radial direction but flexible in the shear direction. By providing the softer sections and harder sections so as to define a plurality of relatively soft, concave, beam-mounted bearing pads mounted relatively rigid beam-mounted bearing pad support faces the bearing becomes shaped so as to deflect in a known manner to provide a hydrodynamic wedge to support a rotating shaft.

Thus, the present invention relates to a hydrodynamic bearing which is constructed entirely of non-newtonian fluidic material and has an extrudable cross-section. The bearing includes a continuous, generally circumferentially skeletal bearing pad support portion having a predetermined rigidity and inner and outer circumferential surfaces. A plurality of radially outwardly extending inner grooves are formed in the inner circumferential surface so as to define a plurality of circumferentially spaced bearing pads. Additionally, the bearing includes a plurality of circumferentially extending grooves in a continuance of the inner grooves and/or a plurality of outer grooves extending radially inward from the outer surface and spaced with respect to the inner grooves so as to define a beam mounted bearing pad support face. The arrangement of the inner circumferential grooves with respect to the circumferential grooves and/or the outer grooves defines a beam-type support network for the bearing pads. The bearing pads may be formed of a material with a softer durometer than the skeletal bearing pad support portion or the bearing pads may be formed of the same material as the support portion. Additionally, a number of deflection control members can be provided within the support structure. The deflection control members have a rigidity which is less than the rigidity of the support structure so as to control deflection of the support structure.

The bearing of the present invention is suitable for use in many applications. However, the bearing is particularly well suited for use in process lubricated applications such as oil well drilling applications, submersible or turbine pump applications and marine drive shaft applications.

The bearing is extruded using known multi-durometer extrusion techniques which are commonly employed in extruding multi-durometer plastic components such as window and door seals, shock absorbing bumpers, and flexible hinges, but have, to applicant's knowledge, not yet been utilized to manufacture bearings.

When utilized to extrude multi-durometer pieces such as the bearings of the present invention, the technique would typically involve a method in which the multi-durometer sections are successively extruded onto one another in a partially cured or uncured state such that no adhesive is required to form the composite extrusion. This is because in the partially cured or uncured state, the extruded materials are inherently gummy or tacky. After the complete tubular section is extruded, the entire extrusion is cured to yield a composite tubular member having multiple sections of varying stiffness (i.e., durometer). In the instance of the bearings of the present invention, the relatively long extrusion having the requisite axial cross-section and appropriate multi-durometer sections is extruded and then cut to form individual bearings. The individual bearings are sized by machining to, among other things, precisely define the required inner diameter and outer diameter.

DETAILED DESCRIPTION OF THE DRAWINGS

Figure 1:
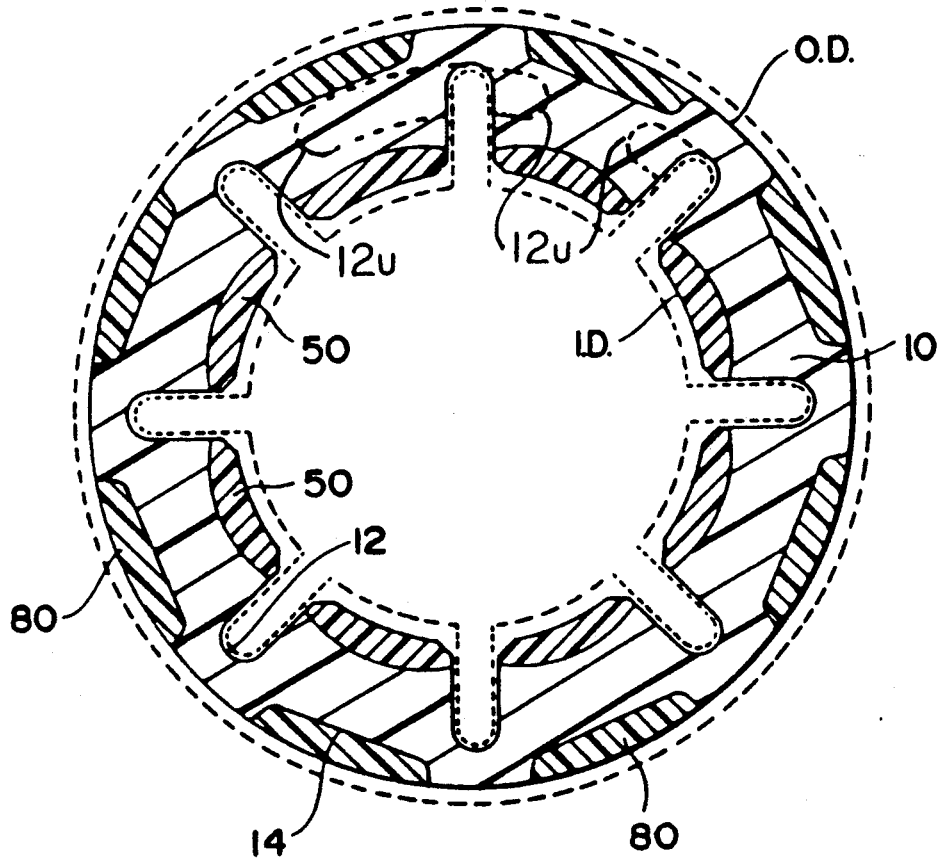
FIG. 1 is an axial cross-section of a bearing in accordance with the present invention which also illustrates two possible modifications thereof.

FIG. 1 is a cross-section of a typical extrudable bearing in accordance with the present invention. In the example illustrated, the bearing is considered extrudable because it has a constant axial cross-section as viewed in FIG. 1.

As illustrated in FIG. 1, the bearing has been machined to the precise required outer O.D. and inner diameter I.D. The phantom lines in FIG. 1 illustrate the inner and outer diameter after extrusion prior to machining. In normal use, the bearing is placed in a housing which intimately contacts the outer diameter of the bearing and the bearing supports a shaft located within the inner diameter of the bearing. Accordingly, the outer diameter of the bearing is a function of the inner diameter of the housing into which the bearing is to be located and the inner diameter is a function of the size of the shaft to be supported. Of course, as with any hydrodynamic bearing, the inner diameter of the bearing is a predetermined amount larger than the outer diameter of the shaft which is to be supported by the bearing so as to allow a fluid film which supports the shaft.

As shown in FIG. 1, the bearing of the present invention is constructed entirely of non-newtonian fluidic materials preferably polymeric or elastomeric materials such as a rubber, plastic or the like. The bearing consists of a composite of sections of non-newtonian fluidic materials having different hardnesses. Specifically, the bearing includes a unitary beam-like skeletal pad support portion 10 constructed of a relatively rigid or hard material, for example, hard durometer shore D rubber. The skeletal pad support portion 10 is generally circumferential in shape and includes a plurality of circumferentially spaced radially outwardly extending inner axial grooves 12 formed on the bearing's inner circumferential surface and circumferentially spaced radially inwardly extending outer axial grooves 14 formed on the bearing's outer surface. By virtue of these grooves, the skeletal pad support portion 10 of the illustrated bearing has a somewhat cogged discontinuous circumferential appearance.

The particular shape of the bearing illustrated in FIG. 1 is by no means essential to the present invention and in fact is desirable for only specific applications. The specific cross-section of the bearing in accordance with the present invention for any particular application depends on the deflections required to achieve optimum results. Thus, in certain instances it may be desirable to provide a bearing which does not include outer axial grooves such as those shown at 14 in FIG. 1. Moreover, the grooves could have various cross-sections, e.g., more or less tapered, to achieve the most desirable functions under load. As shown in phantom, the bearing could also be provided with at least one circumferentially extending undercut of the type shown at 12u. Although one undercut per bearing pad is sufficient for a unidirectional bearing, at least two symmetrically arranged undercuts per bearing pad should be provided if the bearing is to be bidirectional. In FIG. 1, the single undercut and double undercut constructions are illustrated on one bearing pad each for simplicity. However, it should be understood that if either of these constructions is to be employed they must be used on each of the bearing pads to ensure uniform operation.

Figure 3:
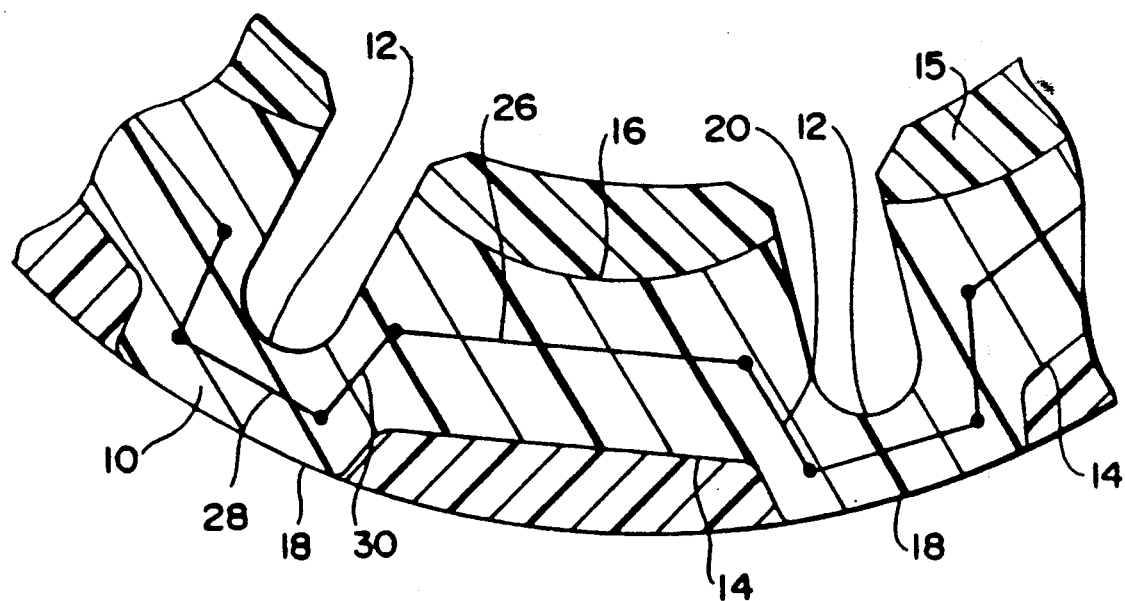
FIG. 3 is an enlarged partial axial cross-section of a bearing in accordance with the present invention.

When the bearing of the present invention is provided with both inner and outer axial grooves and when the inner grooves are located between adjacent outer grooves as illustrated in FIG. 1, the skeletal pad support structure functions as a network of essentially circumferential and radial beams adapted to deflect under load. FIG. 3 illustrates a portion of the beam network for a portion of a bearing similar to that shown in FIG. 1. The bearing shown in FIG. 1 includes eight bearing pad support sectors or segments. The pad support sectors or segments are defined by the spaced inner axial grooves 12. Each pad support sector or segment includes an arcuate bearing pad support face 16 defined by the radially innermost surface of the pad support segment, a housing contacting surface 18 defined by the radially outermost portions 18 of the pad support segments and a pair of connecting portions 20 connecting the housing contacting portions 18 with the bearing support face 16. By virtue of this construction, the skeletal pad support portion 10 functions as a network of beams as illustrated in FIG. 3. The network of beams includes the inner circumferential beams illustrated at 26, the outer circumferential beams illustrated at 28 and the radial beams illustrated at 30. Under load, this network of bearing deflects in a manner which is determinable based upon the degree of the load, the material used in the skeletal pad support structure 10 and the size and spacing of the inner and outer axial grooves.

At this point it should be noted that although the non-newtonian fluidic material used in the skeletal pad support portion 10 is described herein as relatively rigid or hard as compared to the relatively flexible or soft materials used in other portions of the bearings described below, the material used to form the skeletal pad support portion 10 is significantly more flexible than the metals which typically form the skeletal portions of journal or sleeve bearings. Accordingly, it is to be expected that the skeletal portion of the bearings of the present invention deflect under load to a far greater degree than bearings having metallic skeletal portions. A typical skeletal material in the present invention would have a hardness on the Shore D scale.

Referring to FIG. 1, the bearing of the present invention also includes a plurality of relatively soft or flexible bearing pads 50 corresponding in number to the number of bearing pad support surfaces provided on the skeletal portion 10. In accordance with an important aspect of the present invention, the bearing pads are preferably fused to the skeletal portion so as to be formed as part of the skeletal portion. The bearing pads 50 are concave in cross-section as shown in FIG. 1 and are somewhat radially thicker in the middle and arcuately taper inward toward their circumferential ends. The reason for this thicker middle and thinner end portion is to facilitate deflection of the bearing pad under load. The bearing pads 50 are formed of a relatively soft or flexible non-newtonian fluidic material, preferably a polymer or elastomer such as rubber, plastic or the like. For example, the bearing pads 50 may be constructed of durometer Shore A rubber. The material used to form the bearing pad is preferably substantially softer or more flexible, i.e., less rigid, than the material used to form the skeletal portion 10. The softer material provides better performance and reduces shaft wear in low viscosity or abrasive lubricant operating conditions.

Since both the skeletal portion 10 and the bearing pads 50 are constructed of non-newtonian fluids, they tend to flow in a determinable manner under load. In a typical usage situation, the bearing is subject to both radial loads resulting from the weight of the shaft and shear loads resulting from the rotation of the shaft. Since the bearing is restrained in the radial direction by a housing in normal usage, the fluidic materials of which the bearing is constructed are incompressible in the radial direction. However, this is true only to the extent the bearing is restrained by the housing in the radial direction. For instance, if the outer axial grooves 14 are not filled, with deflection control members, as described below, portions along the outer circumference of the bearing are not restrained by the housing in the radial direction. Accordingly, some radial deflection of the bearing can occur.

Figure 4:
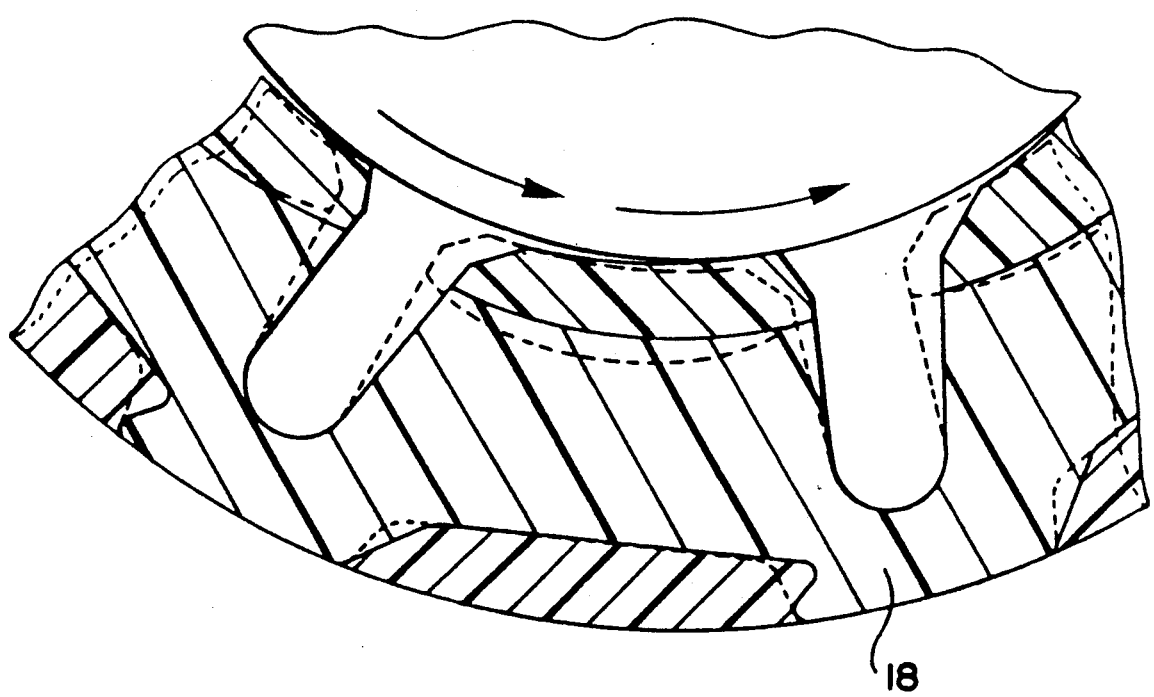
FIG. 4 is a partial cross-section illustrating a bearing according to the present invention deflecting under the load of a rotating shaft.

When the bearing is entirely restrained in the radial direction by the housing, it is nearly incompressible in the radial direction and the radial load is absorbed by the fluid film between the bearing pads 50 and the rotating shaft. On the other hand, by virtue of the inner axial grooves 12, neither the bearing pads nor the skeletal portion 10 is restrained from circumferential deflection in response to the shear load applied by the rotating shaft. Moreover, since there is a gap between the shaft and the radially inner most surface of the bearing pads 50, the entire bearing pad 50 and the associated segment of the skeletal portion 10 can swing upward in response to the shear load applied by the rotating shaft to form a hydrodynamic wedge. An example of such deflection (greatly exaggerated) is illustrated in FIG. 4. Of course, because the material used in the bearing pad 50 is much softer and more flexible than the material used in the skeletal portion 10, the bearing portions 50 deflect or flow to a much greater extent than the skeletal portion 10. Ideally, the bearing pads 50 and the skeletal portion 10 deflect so as to form a wedge across the entire circumferential face of the bearing pads 50. When a wedge is created across the entire face of the bearing pad, optimum results are achieved because the greatest possible hydrodynamic advantage is generated.

For any particular application, the bearing of the present invention must be designed so as to deflect in a manner which allows formation of a hydrodynamic wedge across the entire innermost circumferential face of the bearing pads. Various factors must be taken into account to design a bearing to deflect in such a manner. For instance, the degree of shear and radial load applied, the flexibility of the materials employed in the bearing pad and skeletal portion, the size and shape of the inner and outer axial grooves and the flexibility of the bearing pads and skeletal portion all must be considered.

The flexibility of the bearing pad and skeletal portion is ultimately a consequence of the design of the bearing. For instance, the flexibility of these elements can obviously be varied by varying the type of material employed in the bearing pads and skeletal portions. The flexibility is also influenced by the size, shape and circumferential positioning of the inner and outer axial grooves. In accordance with an important aspect of the present invention, the flexibility of the bearing pads and skeletal portions may also be influenced by providing non-newtonian fluidic material in all or part of either the outer or inner axial grooves. For example, as shown in FIG. 1, each of the outer axial grooves 14 are substantially completely filled by deflection control members 80. While in the illustrated embodiment, deflection control members 80 are provided only in the outer axial grooves, it is possible to provide deflection control members in the inner axial grooves as well. In any instance, the control members are preferably fused to either the skeletal portion and/or the bearing pad.

In the illustrated example, the deflection control members 80 are of a relatively soft or flexible non-newtonian fluidic material preferably an elastomer or polymer such as rubber, plastic or the like. For example, Shore A soft durometer rubber could be used to form the deflection control members as well as the bearing pads. Alternatively, different materials could be used depending upon the degree of deflection control required or desired. As shown in FIG. 1, the deflection control members 80 have the same shape as the outer axial grooves 14. Accordingly, the deflection control members 80 fill the axial grooves 14 completely. However, this is not necessarily so. Specifically, it is possible that the deflection control members could be provided so as to only partially fill the grooves 14. This would of course, effect the degree of deflection control provided by the deflection control members.

The deflection control members 80 act by filling the grooves to a predetermined extent so as to limit the flexibility in the shear direction of the skeletal portion 10. It follows that the degree of limiting of the flexibility of the skeletal portion depends upon the degree to which the deflection control members fill the inner and outer grooves and the flexibility of the material used in the deflection control members. It is also possible that the deflection control members could be constructed of the same material as the bearing pads and be formed to be unitary therewith. It is noted that with a filled groove the radial restraint is high while in the shear or circumferential direction the flexibility is high. In other words, the overall pad structure is stiff in the radial direction and flexible in the shear direction to form a wedge for hydrodynamic lubrication.

As previously noted, the bearing of the present invention is preferably constructed entirely of new-newtonian fluidic materials preferably polymeric or elastomeric materials such as rubber, plastic and the like. By virtue of its construction entirely of such fluid materials, the bearing of the present invention exhibits a number of unique performance characteristics. For instance, the high radial stiffness combined with the inward movement of the pad results in accurate shaft positioning and optimum fluid film formation. Film formation reduces shaft wear and provides for high load carrying capability. Additionally, bearings constructed of non-newtonian fluidic materials such as elastomers exhibit exceptional abrasion resistance in process lubricated applications. Finally, some non-newtonian fluidic materials such as elastomers and polymers are also resistant to corrosion by substances which corrode non-fluidic materials such as metals. The need for radial stiffness and the need for abrasion resistance have heretofore been believed incompatible. However, the use of a multidurometer composite consisting entirely of non-newtonian fluidic materials makes it possible to achieve both beneficial results. Finally, some non-newtonian fluidic materials such as elastomers and polymers are also resistant to corrosion by substances which corrode non-fluidic materials such as metals.

The non-newtonian fluidic materials used in the bearings of the present invention are restrained along their outer periphery by the housing in which the bearing is located. Accordingly, the bearings are constrained to deflect or bulge along the axial end portions which are not restrained. The degree of bulging of the bearings out of the unrestrained axial ends thereof is indicative of the radial stiffness of the bearing. The degree of bulging, and hence the bearings radial stiffness, depends on the size or area of unrestrained non-newtonian fluidic material and the stiffness of the non-newtonian fluidic material used.

As noted above, conventional cutless or wear-type journal bearings are typically constructed of a single durometer elastomer mounted in a metal cylinder. Because the metal is incompressible, relatively large sections of soft durometer material must be provided. Accordingly, and because there is nothing to restrain the relatively large sections of material, these bearings exhibit a relatively large amount of bulge out of the axial ends of the bearings. The great degree of bulge means that the bearing has very little radial stiffness. Of course, this is expected given the large cross-section of unrestrained area and the soft material used. In response to the load of a shaft, these bearings typically deform so as to conform to the shape of the shaft such that a true hydrodynamic wedge is not formed. Thus, these wear-type bearings function mainly as elastomeric wear sleeves for the shaft. The resulting contact between the bearing pads and the shaft can generate a great deal of heat which can alter the material characteristics of the bearing pad material and thereby reduce the life expectancy of the bearing.

Since, as shown in FIG. 1, the relatively stiff skeletal portion 10 is a large portion of the axial cross-section of the bearings of the present invention, the unrestrained cross-sectional area of the relatively soft durometer material in the bearings of the present invention is significantly reduced. In particular, because the skeletal portion 10 is constructed of a relatively stiff material, it is not subject to a great deal of such bulging. Accordingly, only the materials used in the sections 80 and bearing pads 50 are subject to appreciable axial bulging. In other words, the cross-section bulge area of the bearings of the present invention is significantly reduced from that of prior art wear-type bearings. Thus, the provision of the relatively stiff skeletal portion provides the bearing with much greater radial stiffness. As a result of this radial stiffness, the bearing of the present invention does not simply deform, it also deflects to form a hydrodynamic wedge which allows the bearings of the present invention to carry a far greater load and, more importantly, reduces the wear on the bearings thereby increasing the life expectancy of the bearings. Thus, another significant advantage of the present invention is the reduction of bulging of the axial ends of the bearing which increases the radial stiffness of the bearing and reduces wear.

To a large extent the advantages obtained by virtue of the present invention are achieved through the use of the bearing constructed entirely of non-newtonian fluidic material which has sections of different rigidity. In the example shown in FIGS. 1-4, the variations in rigidity are primarily provided through the use of materials having different rigidities. It is also possible to alter the rigidity of a bearing section by undercutting or otherwise altering its cross-sectional profile. FIGS. 6-10 illustrate embodiments of bearings in which variations in the rigidity of the pad support structure are introduced in whole, or in part, by alterations made to the cross-sectional profile.

Figure 6:
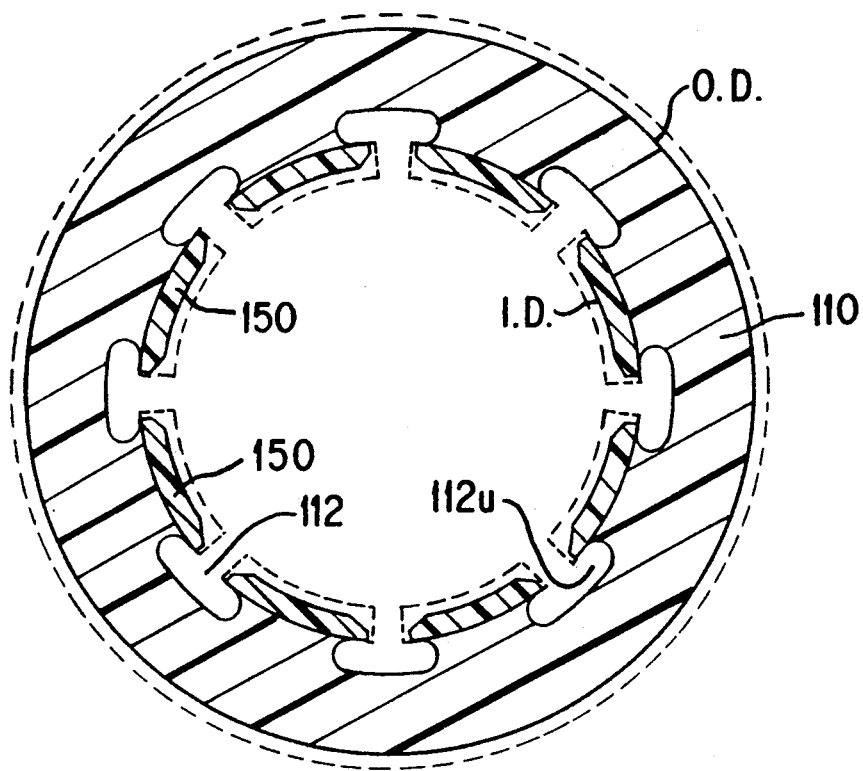
FIG. 6 is an axial cross-section of another bearing in accordance with the present invention.
Figure 7:
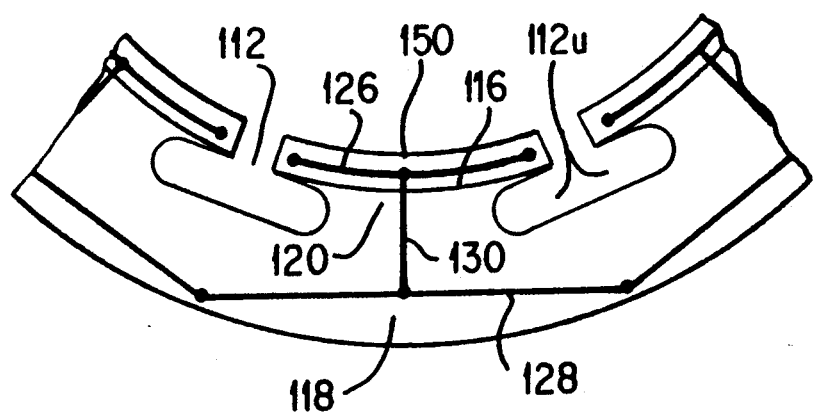
FIG. 7 is an enlarged partial axial cross-section of the bearing of FIG. 6.
Figure 8:
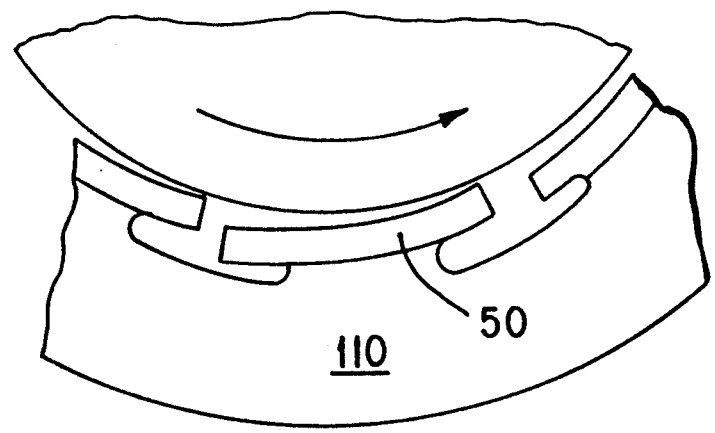
FIG. 8 is a partial cross-section illustrating a bearing of FIG. 6 deflecting under the load of a rotating shaft.

FIGS. 6–8 illustrate another extrudable bearing in accordance with the present invention. Again, the bearing is considered extrudable because it has a constant axial cross-section as viewed in FIG. 6.

As illustrated in FIG. 6, the bearing has been machined to the precise required outer diameter O.D. and inner diameter I.D. The phantom lines in FIG. 6 illustrate the inner and outer diameter after extrusion but prior to machining. In normal use, the bearing is placed in a housing which intimately contacts the outer diameter of the bearing and the bearing supports a shaft located within the inner diameter of the bearing. Accordingly, like the bearing of FIG. 1, the outer diameter of the bearing is a function of the inner diameter of the housing into which the bearing is to be located and inner diameter is the function of the size of the shaft to be supported. As with any hydrodynamic bearing, the inner diameter of the bearing is a predetermined amount larger than the outer diameter of the shaft which is to be supported by the bearing so as to allow fluid film which supports the shaft.

Aside from the different cross-section and the resulting difference in the skeletal support portion, the construction shown in FIGS. 6–8 utilizes the same principles described above with respect to the bearing shown in FIGS. 1–4. However, in the bearing of FIGS. 6–8 the variations in rigidity of the support structure required to achieve wedge formation are achieved both through the use of different materials and through the cross-sectional profile of the bearing.

Like the bearing of FIG. 1, the bearing shown in FIG. 6 is constructed entirely of non-newtonian fluidic materials, preferably polymeric or elastomeric materials such as rubber, plastic, or the like. The bearing consists of a composite of non-newtonian fluidic materials having different hardnesses. Specifically, the bearing includes a unitary beam-like skeletal pad support portion 110 constructed of a relatively rigid or hard material, for example, hard durometer shore D rubber. The skeletal pad support portion 110 is generally circular in shape and includes a plurality of circumferentially spaced radially outward extending inner axial grooves 112 which are flared to provide a plurality of circumferentially or tangentially extending grooves 112u extending from the outermost portion the inner axial grooves 112. The bearing of FIG. 6 also includes a plurality of relatively soft and flexible bearing pads 150 corresponding in number to the number of bearing pad support surfaces provided on the skeletal support portion 110. In accordance with an important aspect of the present invention, the bearing pads are preferably fused to the skeletal portion. The bearing pads 150 are concave in cross-section as shown in FIG. 6 and are somewhat radially thicker in the middle and arcuately tapered inward the their circumferential ends. This shape facilitates deflection of the bearing pad under load. As in the previously described embodiment, the bearing pads 150 are formed of a relatively soft or flexible non-newtonian fluidic material, preferably a polymer or elastomeric material such as rubber, plastic or the like. For example, the bearing pads 150 may be constructed of Shore A durometer rubber. The material used to form the bearing pad is preferably substantially softer or more flexible than the material used to form the skeletal portion 110. The softer material can provide better performance and reduce shaft wear in low viscosity or abrasive lubricant operating conditions. However, as discussed below in connection with the embodiment of FIG. 9, it is not necessary to use bearing pads of a softer material.

As best shown in FIG. 6, the tangential or circumferential grooves 112u undercut either the bearing pads (in the case of an I-shaped pad support portion) or the bearing pad support portion (in the case of a T-shaped pad support portion). The tangential or circumferentially extending axial grooves 112u undercut the plurality of bearing pads 150 defined by the axial grooves 112.

The axial grooves 112 and the tangential or circumferential grooves 112u together define a skeletal pad support portion 110 which has the appearance of a continuous ring having a plurality of equally spaced pedestals extending radially inward. The pedestals of the skeletal support portion 110 may be either T-shaped or I-shaped, the difference being the circumferential extent of the pad support surface. More specifically, the support face may extend along the entire bearing pad or only a circumferential portion thereof as shown, depending on the size and location of the undercut 112u. If desired, the skeletal support portion 110 could be provided with a plurality of spaced outer axial grooves such as those shown at 14 in FIG. 1. Further, many of the grooves provided in the skeletal support portion could have various cross-sections, e.g., more or less tapered, to achieve the desired function under load.

In either case, provision of the tangential or circumferential grooves 112u result in a cantilever-type support for the bearing pads 150 by defining a pad support portion which is capable of deflection in the circumferential direction relatively easily. In the embodiment shown in FIG. 6, the skeletal support portion forms a radially rigid pad support portion such that the bearing is not too easily compressed in the radial direction. However, bearings shown in FIGS. 6–8 may be extruded into long tubes in the manner shown in FIG. 2.

When the bearing illustrated in FIG. 6 is provided with inner axial grooves and tangential or circumferential grooves as illustrated in FIG. 6, the skeletal pads support portions functions as a network of beams adapted to deflect under load. FIG. 7 illustrates a portion of the beam network for a portion of a bearing similar to that shown in FIG. 6. The bearing shown in FIG. 6 includes eight pad support sectors or segments. As noted above, the pad support sectors or segments are defined by the spaced inner axial grooves 112 and the tangential or circumferential grooves 112u which can either undercut the pad support segment or reduce its circumferential face width. Each pad support sector includes an arcuate bearing pad support face 116 defined by the radially innermost surface of the pad support segment, a pedestal-like connecting portion 120 and a housing contacting surface 118 supporting the pedestal portion. By virtue of this construction, the skeletal pad support portion 110 functions as a network of beams as illustrated in FIG. 7. The network of beams includes a circumferential beam 126 defined by either the pad support surface or the bearing pad itself, a radially extending pedestal type beam 130 and tangential or circumferential outer beams 128. Under load this network of beams deflects in a manner which is determinable based upon the degree of load, the material used in the skeletal pad support structure 110, and the size and spacing of the grooves 112 and 112u.

Since both the skeletal portion 110 and the bearing pads 150 are constructed of non-newtonian fluids, they tend to flow in a determinable manner under load. In a typical usage situation, the bearing is subject to both radial loads resulting from the weight of the shaft and shear loads resulting from the rotation of the shaft. Since the bearing is restrained in the radial direction by housing in normal usage, the fluidic materials of which the bearing is constructed are nearly incompressible in the radial direction. However, this is true only to the extent the bearing is restrained by the housing in the radial direction. Thus, those portions of the bearing pad or bearing pad's support surface which are undercut are not restrained by the housing in the radial direction. Accordingly, these portions are subject to radial deflection which can result in flow of the non-newtonian fluidic material.

When the bearing is entirely restrained in the radial direction by the housing, it is nearly incompressible in the radial direction and the radial load is absorbed by the fluid film between the bearing pads 150 and the rotating shaft. On the other hand, by virtue of the inner axial grooves 112, neither of the bearing pads nor the skeletal portion 110 is restrained from circumferential deflection in response to the shear load applied by the rotating shaft. Moreover, because of the undercuts 112u there is a gap between the shaft and the radially innermost surface of the bearing pads 150. Because of this gap and the fact that the bearing is constructed of non-newtonian fluidic material, the entire bearing pad 150 and the associated segment of the skeletal portion 110 can swing upward in response to the shear load applied by the rotating shaft to form a hydrodynamic wedge. An example of such deflection (greatly exaggerated) is illustrated in FIG. 8. As noted above, because the material used in the bearing pad 150 is much softer and more flexible than the material used in the skeletal portion, the bearing portions 50 deflect or flow to a much greater extent than the skeletal portion 110. Ideally, the bearing pads 150 and the skeletal portion 110 deflects so to form a wedge across the entire circumferential face of the bearing pads 150. When a wedge is created across the entire face of the bearing pad, optimum results are achieved because the greatest possible hydrodynamic advantage is generated.

Figure 9:
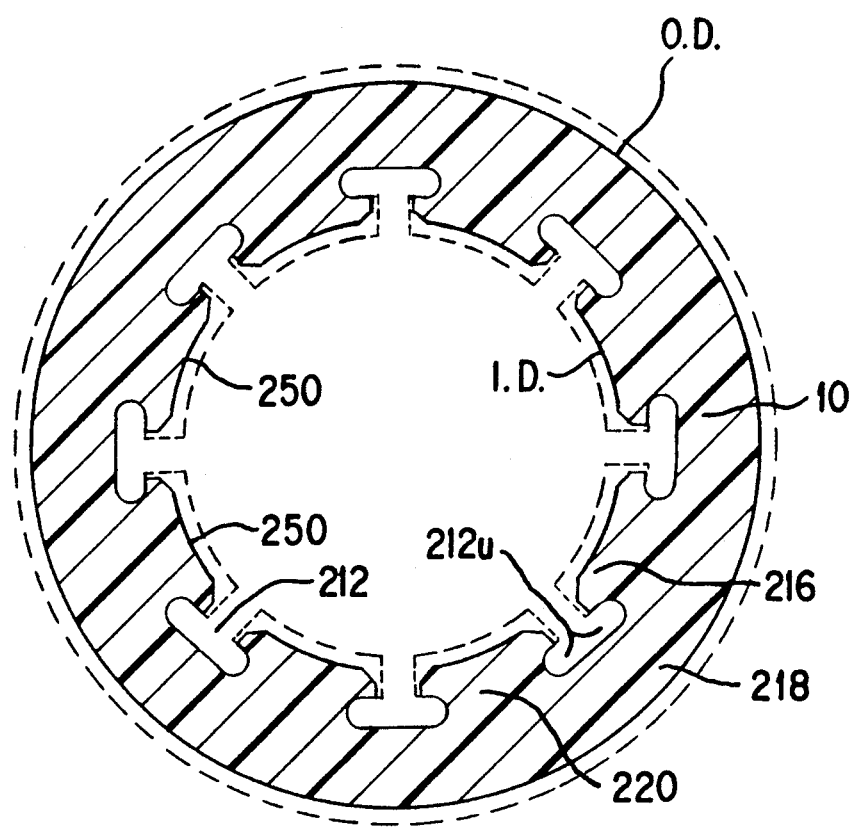
FIG. 9 is an axial cross-section of another bearing in accordance with the present invention.
Figure 10:
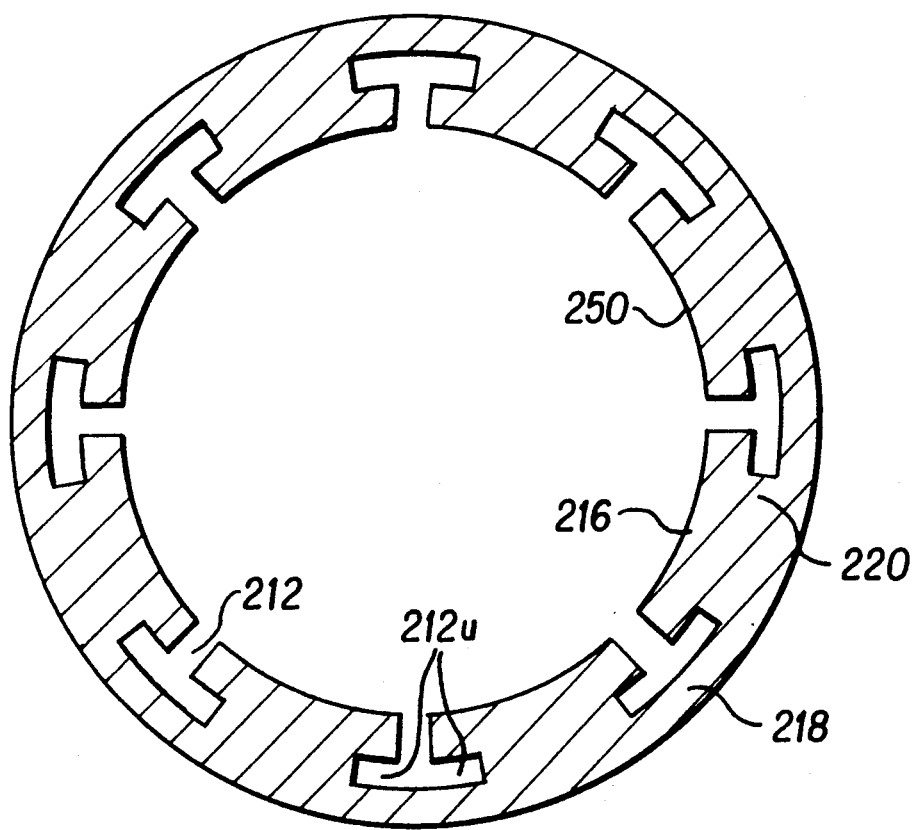
FIG. 10 is an axial cross-section of another bearing in accordance with the present invention.

In some cases, it has been discovered that it is not necessary to use materials of different durometers in order to achieve the advantageous results of the present invention. FIGS. 9 and 10 illustrate bearings in which variations in the rigidity of the support structure and the advantageous results of the present invention are achieved simply by constructing the bearing of a relatively rigid non-newtonian fluid and providing inner grooves 212 with undercuts 212u. As discussed above, the provision of axial grooves 212 and undercuts 212u results in a variation in the rigidity of the support structure. This, taken in conjunction with the use of non-newtonian fluidic materials allows wedge formation under loading. Specifically, as discussed above with respect to FIGS. 6-8, the provision of the inner axial grooves 212 and the undercut extensions 212u thereof define a pedestal-type support structure for the bearing pads. Because the bearing has a homogeneous construction the pad material flows at the same rate as the support structure under load.

As noted previously, since the housing to which the bearing to be mounted completely restrains the housing contacting portion 118, 218 in the radial direction, this portion is incompressible in the radial direction. However, the thickness of the housing contacting portion 118, 218 affects the ability of this portion to flow in response to the shear forces resulting from rotation of the shaft relative to the bearing pads. Consequently, the portion 118, 218 must be thick enough to avoid buckling in response to shear load. A bearing such as that shown in FIG. 10 offers the advantage of having a smaller radial envelope than conventional bearings or the bearing shown in FIG. 9. This is an advantage both because it reduces the size of the housing necessary to support the bearing and because it allows the use of proportionately smaller bearings in applications requiring them.

Again, it must be noted that while the non-newtonian fluidic material used in the skeletal pad support portion 10, 110, 210 is described as relatively rigid or hard as compared to a relatively flexible or soft material used in other portions of the bearings described above, the material used to form the skeletal pad support portion 10, 110, 210 is significantly more flexible than the metals which typically form the skeletal portions of journal or sleeve bearings. Accordingly, it is to be expected that the skeletal portion of the bearings of the present invention deflect under load to a far greater extent than bearings having a metallic skeletal portion. A typical skeletal material in the present invention would have a hardness on the Shore D scale.

In summary the bearing of the present invention includes a generally circumferential skeletal portion formed of a relatively rigid non-newtonian fluid. A plurality of inner axially extending radial grooves are formed on the inner circumference of the skeletal portion. The inner axial grooves are circumferentially spaced with respect to one another. The inner axial grooves may be circumferentially flared or extended to undercut the bearing pads. The skeletal portion also can include a plurality of outer axial grooves preferably equal in number to the inner axial grooves and spaced about the outer circumference of the skeletal portion preferably centered about a mid point which is directly between two opposed inner axial grooves. The bearing further includes a plurality of bearing pads equal in number to the inner axial grooves. The bearing pads can be integral with the skeletal structure or they can be separate and fused to portions of the skeletal portion defined by the inner axial grooves so as to be formed as an integral part thereof. The bearing may also include deflection control members located in the inner axial grooves and/or the outer axial grooves. The deflection control members may fill entirely the axial grooves or only partially fill the axial grooves.

With the bearing construction described above, it is possible to achieve virtually any desired deflection in response to a known or determinable load. Specifically, the bearing pad support can be designed for movement with six degrees of freedom. In contrast, the bearing pad support of conventional wear-type bearings cannot move in the radial direction. The tendency of the bearing pads to deflect and the degree of deflection under a known load may be varied by varying a number of different parameters. First, the degree of deflection can be varied by varying the cross-section of the bearing. Specifically, the number and depth of the inner and outer axial grooves and the circumferential dimensions of the bearing pads and skeletal portion define the beam network for supporting the bearing pads and consequently influence the degree of deflection of the bearing pads under load.

Further, the choice of materials for the various components of the bearing affects the deflection characteristics of the bearing. In this regard, the hardness or flexibility of the non-newtonian fluidic material employed is the most critical characteristic to be taken into consideration.

Finally, the size and location of the deflection control members influences the deflection characteristics of the bearing. In extreme cases, the deflection control member can be constructed of the same material as the skeletal portion so that, for practical purposes, the skeletal portion does not include the outer axial grooves. In the other extreme case, the outer axial grooves or the inner axial grooves can be left completely unfilled to allow free, unrestrained deflection. In summary, by varying the foregoing parameters, bearings can be designed in accordance with the present invention to achieve virtually any desired deflection.

In designing bearings in accordance with the present invention, several points should be kept in mind. Foremost among these is the need to maintain an extrudable cross-section such as a constant cross-section in the bearing, when the axial cross-section of the bearing is constant, the bearing can be easily extruded as discussed below at a tremendously low cost. Naturally, the deflection characteristics of the bearing can be varied by varying the cross-section of the individual bearing such as by providing circumferential grooves, partial radial grooves or radial bores. However, such variations from the preferred constant cross-section require additional machining after the extrusion and sizing (machining of the inner and outer diameters) of the bearing and should therefore be avoided unless the resulting performance benefits justify the increased cost of manufacture.

When provided with a composite construction, the bearings of the present invention also may be generally characterized as a multi-durometer bearings since they include multiple sections having different durometers (degrees of rigidity). Specifically, higher durometer (more rigid) non-newtonian fluids are used for strength and low durometer (more flexible) non-newtonian fluidic materials are used for flexibility. The various durometer sections are fused together. For instance, in the bearing illustrated in FIGS. 1-4 different materials could be used for the skeletal portion, the bearing pads and the deflection control members. Generally, more rigid materials would be used for the skeletal portion and less rigid, more flexible, materials would be used for the bearing pads and the deflection control members.

The novel bearing of the present invention may be made in accordance with a novel method of manufacture which is discussed hereinafter with reference to FIG. 5.

Figure 5:
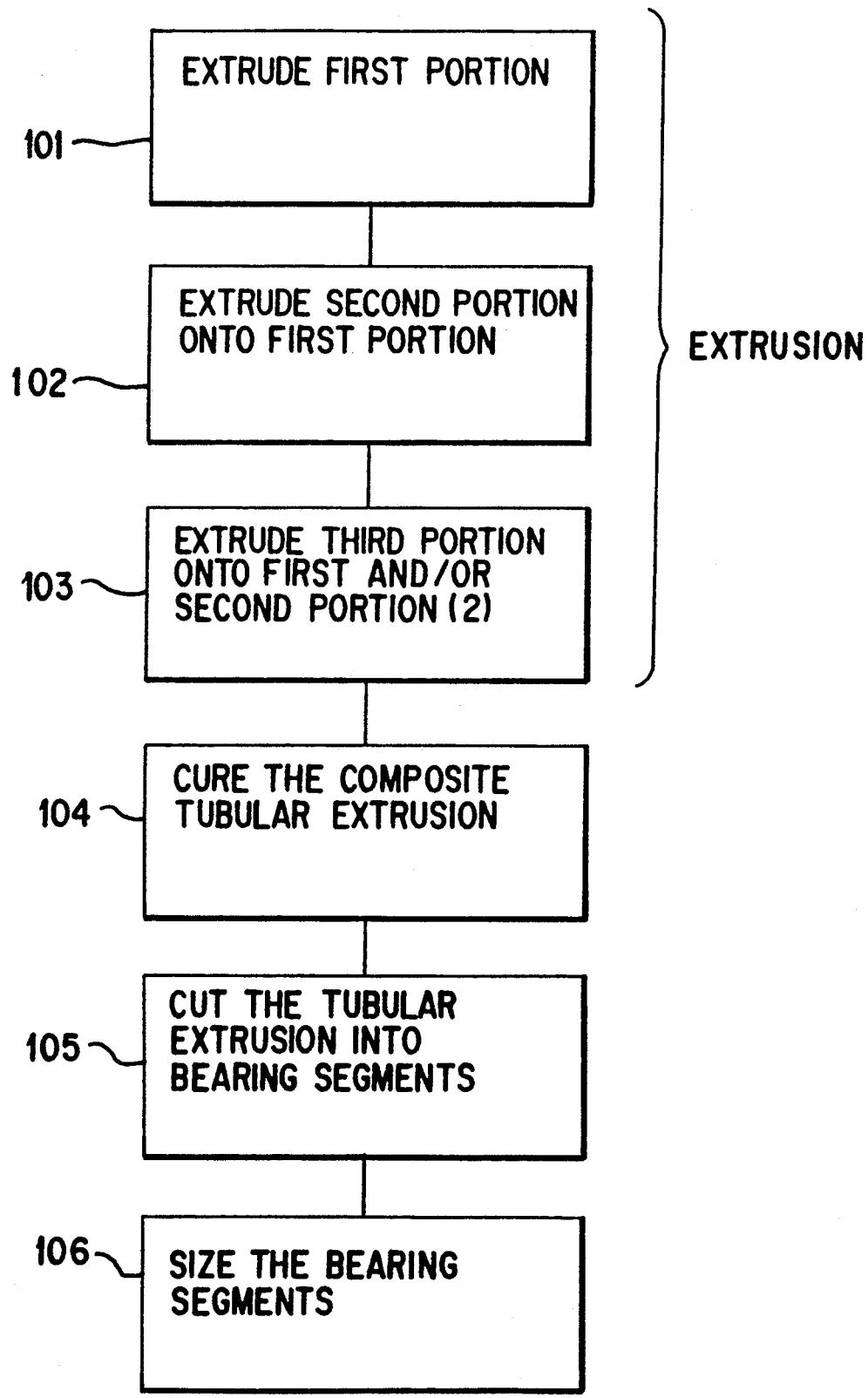
FIG. 5 is a diagram of the general steps employed in manufacturing a bearing according to the method of the present invention.

As indicated in FIG. 5, the method of making a bearing in accordance with the present invention involves four general steps, to wit, extrusion, curing, cutting and sizing.

The first step, extrusion, can involve two or more sub-steps. The number of sub-steps depends upon the number of different materials to be used in the bearing and the location of the various bearing sections. It should be pointed out that the multidurometer form of bearing is extruded using known multidurometer extrusion techniques which are commonly employed in extruding plastic components such as window and door seals, shock absorbing bumpers, and flexible hinges. In the example illustrated in FIG. 5, three extrusion sub-steps are employed. This corresponds to the number of extrusion sub-steps which would be preferably be used to form a bearing of the type shown in FIG. 1.

At the first sub-step 101, a first portion of the bearing is extruded. In the example illustrated in producing the bearing illustrated in FIG. 1, the first portion to be extruded would presumably be the inner portion 50. This portion would be extruded in an uncured or partially cured state. In the case of bearings such as those shown in FIGS. 9 and 10, the entire bearing is extruded in one step.

Step 102 closely follows step 101 and involves the extrusion of a second portion onto the uncured or partially cured first portion. In extruding the bearing illustrated in FIG. 1, step 102, would presumably involve the extrusion of the skeletal portion 10 onto the associated portion of the pad face 50.

After completion of step 102, if additional bearing sections are required, they are extruded in further extrusion sub-steps. In extruding the bearing illustrated in FIG. 1, a third extrusion sub-step 103 is performed. During this extrusion sub-step the outer deflection control members 80 are extruded into the outer axial grooves.

It is important to note that each successive extrusion is uncured or only partially cured so that it is not necessary to apply an adhesive to join the successive extrusions during the extrusion process. Specifically, in the uncured or partially cured state the non-newtonian fluidic materials employed in the bearings of the present invention are gummy or tacky such that no adhesive is necessary to adhere the successive excretion extrusions. Thus, in accordance with the present invention, the bearing sections are fused to one another without the aid of a foreign substance such as an adhesive.

Completion of the extrusion process yields a composite uncured or partially cured tubular extrusion. After the extrusion process is completed, the composite tubular extrusion is cured at step 104 to yield a cured tubular extrusion in which the various bearing sections having varied durometers are fused to one another.

Figure 2:
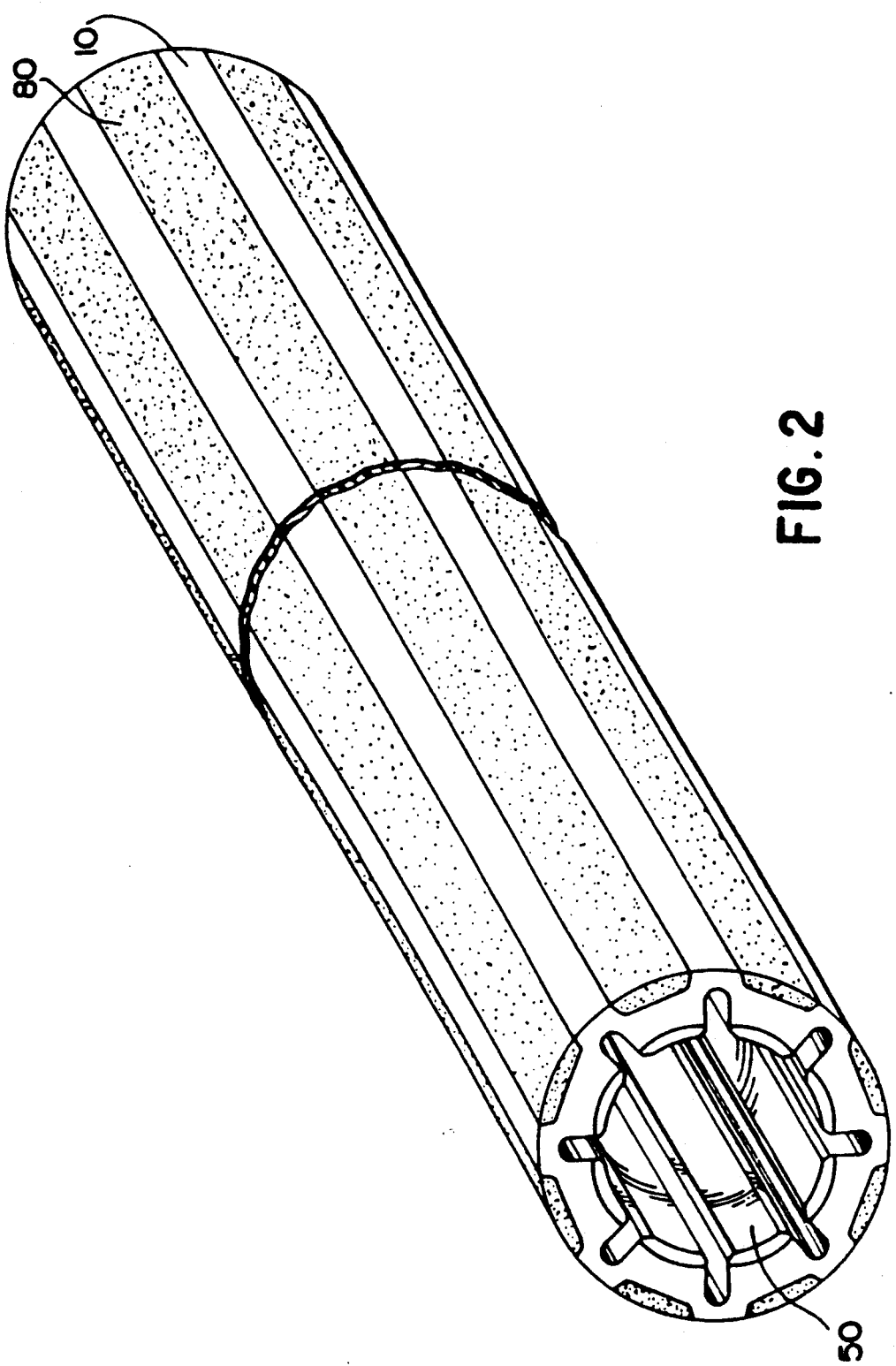
FIG. 2 is a perspective view of a tubular extrusion in accordance with the present invention.

FIG. 2 illustrates an example of a tubular extrusion in accordance with the present invention. As suggested by FIG. 2, the extrusion is preferably quite long so that a large number of bearings can be formed from any one extrusion.

At step 105, the cured tubular extrusion is cut into segments having axial thicknesses corresponding to the desired axial thickness of the bearing. In other words, a tubular extrusion is divided into bearing segments. For example, one tubular extrusion, such as that shown in FIG. 1, may be divided into 40-50 individual bearing segments.

In step 106, the individual bearing segments are sized. In the simplest and preferred embodiment, the sizing step simply involves machining the bearing segments to define precisely the desired inner and outer diameters. Naturally, this step is only possible if the tubular extrusion has a outer diameter which is larger than the desired outer diameter and an inner diameter which is smaller than the desired inner diameter. In FIGS. 1, 6 and 9 the phantom lines illustrate generally, the degree of extra material which should be provided to insure that the bearing segments can be properly sized.

The sizing step 106 can also involve additional machining of the bearing segments to the extent cost of such machining is justified by the improved performance derived from the additional machining. For instance, it may also be desirable to provide non-uniformities in the cross-section of the bearing segments such as circumferential grooves and radial bores. Such steps, which can potentially add a great deal to the cost of individual bearings, would normally not be justified, particularly since a wide variety of deflection characteristics can be achieved, as discussed above, while maintaining a constant extrudable bearing cross-section.

I claim:

1. A hydrodynamic bearing for supporting a shaft on a fluid film, characterized in that the bearing includes: a generally circumferential skeletal bearing pad support portion formed of a non-newtonian fluidic material and having a predetermined radial rigidity, the skeletal portion having inner and outer circumferential surfaces; a plurality of inner axial grooves formed in the inner surface and spaced circumferentially so as to define a plurality of bearing pad support surfaces; a plurality of bearing- pads formed of a non-newtonian fluidic material and having a predetermined radial rigidity which is less than the predetermined radial rigidity of the skeletal portion each one of the plurality of bearing pads being fused to a corresponding pad support surface; at least one circumferentially extending undercut flaring out from the radially outer end of each of the inner axial grooves so as to undercut the bearing pads; and a plurality of radially inwardly extending outer grooves formed in the outer circumferential surface and spaced with respect to said inner grooves so as to provide a beam mounted support for the bearing pads.

2. The bearing of claim 1, wherein the axial cross-section of the bearing is constant so that the bearing can be easily extruded.

3. The bearing of claim 1, wherein the bearing is constructed entirely of non-newtonian fluidic materials.

4. The bearing of claim 1, wherein a plurality of radially inwardly extending outer grooves are formed in the outer circumferential surfaces, the outer grooves being spaced circumferentially about the outer circumferential surface and wherein the outer grooves and inner grooves are spaced with respect to one another so as to define a skeletal bearing pad support portion having beam mounted bearing pad support surfaces which can move with six degrees of freedom.

5. The bearing of claim 4, further comprising a plurality of deflection control members formed in at least one of said radially outwardly extending inner grooves and radially inwardly extending outer grooves.

6. The bearing of claim 5, in which the plurality of deflection control members positioned in at least one of said inner and outer grooves have a predetermined hardness which is less than the hardness of the skeletal portion.

7. The bearing of claim 6, wherein at least one of said deflection control members is formed of the same material as at least one of said bearing pads and is unitary therewith.

8. The bearing of claim 6, wherein said deflection control members are formed of a material having a hardness different than the predetermined hardness of the bearing pad.

9. The bearing of claim 5, wherein the deflection control members are fused to the skeletal bearing pad support portion.

10. The bearing of claim 1, wherein each said bearing pad is formed of a different material than the skeletal support portion and is generally concave in axial cross-section and has circumferential ends in its unstressed state, the bearing pad having an axis of symmetry equidistant from said circumferential ends and said bearing pad having a greater radial thickness along said axis of symmetry than at either of said circumferential ends.

11. The bearing of claim 1, wherein said skeletal portion is a unitary element.

12. A hydrodynamic bearing for supporting a shaft, said hydrodynamic bearing comprising: a skeletal bearing pad support portion having a predetermined rigidity, said skeletal bearing pad support portion being generally circumferential in axial cross-section and having an inner circumferential surface and an outer circumferential surface; a plurality of generally radially outwardly extending inner grooves formed in said inner circumferential surface and a plurality of radially inwardly extending outer grooves formed in said outer circumferential surface, said plurality of inner grooves being spaced circumferentially about said inner surface and said outer grooves being circumferentially spaced about said outer surface; said inner grooves and said outer grooves being circumferentially spaced with respect to one another so as to define a plurality of beam-mounted bearing pad support faces on said inner circumferential surface; and a plurality of bearing pads having a predetermined rigidity which is less than the rigidity of the pad support portion, each one of said bearing pads being positioned on one of said beam-mounted bearing pad support surfaces.

13. The bearing of claim 12, wherein each one of said plurality of bearing pads is fused to one of said bearing pads support surfaces.

14. The bearing of claim 12, further comprising a plurality of deflection control members formed in at least one of said radially outwardly extending inner grooves and radially inwardly extending outer grooves.

15. The bearing of claim 12, wherein each said bearing pad is generally concave in axial cross-section and has circumferential ends in its unstressed state, the bearing pad having an axis of symmetry equidistant from said circumferential ends and said bearing pad having a greater radially thickness along said axis of symmetry than at either of said circumferential ends.

16. The bearing of claim 12, wherein said skeletal portion is a unitary element.

17. The bearing of claim 12, further comprising a plurality of deflection control members positioned in at least one of said inner and outer grooves, said deflection control members having a predetermined hardness which is less than the hardness of the skeletal portion.

18. The bearing of claim 17, wherein at least one of said deflection control members is formed of the same material as at least one of said bearing pads and is unitary therewith.

19. The bearing of claim 18, wherein said deflection control members are formed of a material having hardness different than the predetermined hardness of the bearing pad.

20. The bearing of claim 12, wherein said bearing has a constant axial cross-section so that bearing can be extruded.

21. The bearing of claim 12, wherein the bearing is constructed entirely of non-newtonian fluidic materials.

22. The bearing of claim 12, wherein said bearing pads and said skeletal portion are formed of dissimilar materials having different hardnesses and wherein said bearing pads are fused to said skeletal portion.

23. A hydrodynamic bearing for supporting a shaft, said bearing constructed entirely of non-newtonian fluidic material and having an extrudable cross-section and said bearing comprising: a continuous skeletal bearing pad support portion having a predetermined rigidity, said skeletal bearing pad support portion being generally circumferential in axial cross-section and having an inner circumferential surface and an outer circumferential surface; a plurality of radially outwardly extending inner grooves formed in said inner circumferential surface said plurality of inner grooves being circumferentially spaced about said inner surface and at least one of a circumferentially extending undercut flaring out from the radially outer end of each of the inner axial grooves so as to undercut the bearing pads and a plurality of radially inwardly extending outer grooves formed in and circumferentially spaced about said outer circumferential surface with respect to the inner grooves so as to define a plurality of beam-mounted bearing pad support faces; and a plurality of bearing pads equal in number to said plurality of beam-mounted bearing pad support faces, each said bearing pad being supported on one of said plurality of bearing pad support faces.

24. The bearing of claim 23, wherein the bearing pads are formed of a different material than the skeletal bearing pad support portion.

25. The bearing of claim 23, wherein said bearing is constructed entirely of non-newtonian fluidic materials.

26. The bearing of claim 23, wherein said bearing pads are fused to said bearing pad support faces.

27. The bearing of claim 23, further comprising a plurality of deflection control members, each said deflection control member having a predetermined rigidity which is different than the predetermined rigidity of the skeletal bearing pad support portion, and said plurality of deflection control members being positioned in at least one of said inner grooves.

28. The bearing of claim 27, wherein said deflection control members are fused to said skeletal bearing pad support portion.

29. A hydrodynamic bearing for supporting a shaft, said bearing being constructed entirely of non-newtonian fluidic materials, said bearing comprising a skeletal bearing pad support portion having a predetermined rigidity, said skeletal bearing pad support portion being generally circumferential in axial cross-section and having an inner circumferential surface and an outer circumferential surface; a plurality of radially outwardly extending inner grooves formed in said inner circumferential surface and a plurality of radially inwardly extending outer grooves formed in said outer circumferential surface; the inner grooves being spaced about said inner circumferential surface and said outer grooves being circumferentially spaced about said outer surface, said inner and outer grooves being circumferentially spaced with respect to one another to define a plurality of beam-mounted bearing pad support faces on said inner circumferential surface; and a plurality of bearing pads having a predetermined hardness, each said bearing pads being fused to one of said circumferentially spaced bearing pad support faces.

30. The bearing of claim 29, further comprising a plurality of deflection control members, each said deflection control members having a predetermined hardness which is less than the predetermined hardness of the skeletal bearing pad support portion, and said deflection control members being fused to at least one of said inner grooves and said outer grooves.

31. An extrudable multi-durometer hydrodynamic bearing, said bearing being constructed entirely of non-newtonian fluidic materials and having an extrudable axial cross-section, said bearing comprising: a generally circumferential skeletal bearing pad support portion having a predetermined radial rigidity, said skeletal portion comprising inner and outer circumferential surfaces; a plurality of inner axial grooves formed in said inner surface and at least one of a circumferentially extending undercut flaring out from the radially outer end of each of the inner axial grooves so as to undercut the bearing pads and a plurality of outer axial grooves formed in said outer surface; and a plurality of bearing pads having a predetermined radial rigidity which is less than the predetermined radial rigidity of said skeletal portion, each one of said plurality of bearing pads being formed as part of a corresponding bearing pad support surface.

32. The bearing of claim 31, comprising inner axial grooves and outer axial grooves located in said skeletal bearing pad support portion so that said beam mounted bearing pad support surfaces can move with six degrees of freedom.

33. A hydrodynamic bearing for supporting a shaft rotating in a housing, the bearing being constructed entirely of rubber and having a radially innermost surface and a radially outermost surface, the bearing including a plurality of inner bearing pad regions extending radially inward from the innermost surface, the bearing pad regions having a predetermined compressibility, at least one bearing pad support region located radially outward of the bearing pad regions, the bearing pad support region having a predetermined compressibility that is less than the compressibility of the bearing pad regions and at least one outer region extending radially inward from the outermost surface, the outer region having a predetermined compressibility which is greater than the compressibility of the bearing pad support region, the bearing pad regions, the bearing pad support region and the outer region being disposed so as to provide a beam network for supporting the innermost surface of the bearing pad regions such that, under the action of friction and pressure caused by rotation of the shaft, the innermost surface deforms so as to define a hydrodynamic wedge between the shaft and the bearing.

34. A hydrodynamic bearing for supporting a shaft rotating in a housing, the bearing being constructed entirely of non-newtonian fluidic materials and having an extrudable axial cross-section, the bearing comprising: a generally circumferential bearing having inner and outer circumferential surfaces; a plurality of grooves formed in the inner circumferential surface being formed with a plurality of radial grooves extending radially outward of the inner surface and a plurality of circumferential grooves in continuance of the radial grooves; said radial and circumferential grooves together defining a plurality of circumferentially arranged bearing pads and a unitary support structure comprising a pedestal-like member that supports each pad, a plurality of circumferentially spaced outer grooves extending radially inward from the outer surface of the circumferential member; the outer grooves being spaced with respect to the inner grooves so as to provide a beam-like support for each of the pedestals on which the bearings are supported, wherein each pad comprises axially extending and radially extending edges and a circumferential shaft engaging face, the face of the pad being adapted under the action of friction and pressure on said surface to rock relative to the support member so as to form a hydrodynamic wedge relative to the shaft.

35. The bearing of claim 34, further comprising a plurality of deflection control members, each deflection control member being provided in one of the inner grooves, the circumferential extensions of the inner grooves and the outer grooves, the deflection control members having a hardness which is less than the hardness of the remainder of the bearing.

* * * * *